US009334182B2

(12) United States Patent
Janak

(10) Patent No.: US 9,334,182 B2
(45) Date of Patent: May 10, 2016

(54) PROCESS AND COMPOSITION FOR THE REMOVAL OF HYDROGEN SULFIDE FROM INDUSTRIAL PROCESS FLUIDS

(71) Applicant: LONZA INC., Allendale, NJ (US)

(72) Inventor: Kevin Janak, Ossining, NY (US)

(73) Assignee: LONZA INC., Allendale, NJ (US)

(*) Notice: Subject to any disclaimer, the term of this patent is extended or adjusted under 35 U.S.C. 154(b) by 122 days.

(21) Appl. No.: 14/345,825

(22) PCT Filed: Sep. 21, 2012

(86) PCT No.: PCT/EP2012/068592
§ 371 (c)(1),
(2) Date: Mar. 19, 2014

(87) PCT Pub. No.: WO2013/041654
PCT Pub. Date: Mar. 28, 2013

(65) Prior Publication Data
US 2014/0224743 A1  Aug. 14, 2014

Related U.S. Application Data

(60) Provisional application No. 61/538,265, filed on Sep. 23, 2011.

(51) Int. Cl.
*C02F 1/68* (2006.01)
*C02F 1/50* (2006.01)
*C02F 101/10* (2006.01)
*C02F 103/02* (2006.01)
*C02F 103/00* (2006.01)
*C02F 103/34* (2006.01)

(52) U.S. Cl.
CPC . *C02F 1/683* (2013.01); *C02F 1/50* (2013.01); *C02F 2101/101* (2013.01); *C02F 2103/008* (2013.01); *C02F 2103/023* (2013.01); *C02F 2103/34* (2013.01); *C02F 2303/02* (2013.01); *C02F 2303/08* (2013.01); *C02F 2305/00* (2013.01)

(58) Field of Classification Search
CPC ...... C02F 1/50; C02F 1/683; C02F 2101/101; C02F 2103/008; C02F 2103/34; C02F 2103/023; C02F 2303/02; C02F 2303/08; C02F 2305/00
See application file for complete search history.

(56) References Cited

U.S. PATENT DOCUMENTS

| 1,991,765 | A | 2/1935 | Barnard |
|---|---|---|---|
| 2,426,318 | A | 8/1947 | Menaul |
| 3,035,053 | A | 5/1962 | Coates et al. |
| 3,037,978 | A | 6/1962 | Coates et al. |
| 3,459,852 | A | 8/1969 | Roehm |
| 4,196,149 | A | 4/1980 | Frank et al. |
| 4,239,701 | A | 12/1980 | Frank et al. |
| 4,548,720 | A | 10/1985 | Gilligan, III |
| 4,680,127 | A | 7/1987 | Edmondson |
| 4,978,512 | A | 12/1990 | Dillon |
| 5,085,842 | A | 2/1992 | Porz et al. |
| 5,128,049 | A | 7/1992 | Gatlin |
| 5,225,103 | A | 7/1993 | Hoffmann et al. |
| 5,284,635 | A | 2/1994 | Frederic |
| 5,486,605 | A | 1/1996 | Gatlin |
| 5,498,707 | A | 3/1996 | Gatlin |
| 5,554,349 | A | 9/1996 | Rivers et al. |
| 6,663,841 | B2 | 12/2003 | Salma et al. |
| 6,942,037 | B1 | 9/2005 | Arnold et al. |
| 6,986,358 | B2 | 1/2006 | Mattox et al. |
| 7,438,877 | B2 | 10/2008 | Salma et al. |
| 2010/0099596 | A1 | 4/2010 | Trahan |
| 2010/0261623 | A1 | 10/2010 | Cassidy et al. |
| 2011/0147272 | A1 | 6/2011 | Karas et al. |
| 2012/0046248 | A1* | 2/2012 | Jones ............... A01N 57/20 514/126 |

FOREIGN PATENT DOCUMENTS

| EP | 1624089 A1 | 2/2006 |
|---|---|---|
| GB | 842593 | 7/1960 |
| WO | 94/00392 A1 | 1/1994 |

(Continued)

OTHER PUBLICATIONS

John C. Jeffery, et al., "Self assembly of a novel water soluble iron(II) macrocyclic phosphine complex from tetrakis(hydroxymethyl)phosphonium sulfate and iron(II) ammonium sulfate: single crystal X-ray structure of the complex [Fe(H2O)2{Rp(CH2N(CH2PR2)CH2)2PR}]SO4.4H2O (R = CH2OH)" Chem. Commun., pp. 101-102, 2000.

Paul D. Gilbert, et al., "Tetrakishydroxymethylphosphonium Sulfate (THPS) for Dissolving Iron Sulfides Downhole and Topside—A Study of the Chemistry Influencing Dissolution", Corrosion 2002 Conference, Paper No. 02030.

M.K. Amosa, et al., "Sulphide Scavengers in Oil and Gas Industry—A Review", NAFTA 61(2), pp. 85-92, 2010.

(Continued)

*Primary Examiner* — Lucas Stelling

(74) *Attorney, Agent, or Firm* — Lucas & Mercanti, LLP

(57) ABSTRACT

The invention relates to a method for the prevention and removal of $H_2S$ and/or other sulfhydryl compounds and iron sulfide deposits from gas and/or liquid streams in industrial process systems. Formulations comprising aldehydes, aldehyde donors, and/or aldehyde stabilizers, excluding triazines, in combination with the reaction product of an amino acid and a hydroxymethylphosphine or hydroxymethylphos-phonium salt, and optionally a quaternary ammonium compound and/or one or more N-hydrogen compounds such as 5,5-dialkylhydantoin or amines, are rapidly and sustainedly scavenging $H_2S$ originating from process and/or microbial sources. The formulations possess high capacities for $H_2S$ removal and are relatively pH-insensitive.

19 Claims, No Drawings

(56) References Cited

FOREIGN PATENT DOCUMENTS

| WO | 99/33345 A1 | 7/1999 |
|---|---|---|
| WO | 0208127 A1 | 1/2002 |
| WO | 2010/027353 A1 | 3/2010 |
| WO | 2010/105872 A2 | 9/2010 |

OTHER PUBLICATIONS

Grahame N. Taylor, et al., "Gas Chromatography Mass Spectrometric Analysis of Chemically Derivatized Hexahydrotriazine-Based Hydrogen Sulfide Scavengers: 1", Ind. Eng. Chem. Res., 49, pp. 5977-5980, 2010.

Grahame N. Taylor, et al., "Gas Chromatographic-Mass Spectrometric Analysis of Chemically Derivatized Hexahydrotriazine-based Hydrogen Sulfide Scavengers: Part II", Ind. Eng. Chem. Res., 49, pp. 6267-6269, 2010.

Grahame N. Taylor, et al., "Structural Elucidation of the Solid Byproduct from the Use of 1,3,5-Tris(hydroxyalkyl) hexahydro-s-triazine Based Hydrogen Sulfide Scavengers", Ind. Eng. Chem. Res., 50, pp. 735-740, 2011.

Jurgen G. E. Krauter, et al, "An Easy and Practical Synthetic Route to Electron Rich Water: Soluble Ligands: alpha-Aminomethylation of Trishydroxymethylphosphine", Tetrahedron, 56, pp. 771-774, 2000.

Jan M. Bakke, et al., "Hydrogen Sulfide Scavenging by 1,3,5-Triazinanes. Comparison of the Rates of Reaction", Ind. Eng. Chem. Res., 43, pp. 1962-1965, 2004.

Jan M. Bakke, et al., "Hydrolysis of 1,3,5-Tris(2-hydroxyethyl)hexahydro-s-triazine and Its Reaction with H2S", Ind. Eng. Chem. Res., 40, pp. 6051-6054, 2001.

Douglas E. Berning, et al., "Chemical and Biomedical Motifs of the Reactions of Hydroxymethylphosphines with Amines, Amino Acids, and Model Peptides", J. Am. Chem. Soc., 121, pp. 1658-1664, 1999.

Janne Buhaug, et al., "H2S Scavenging: Chemical Investigations of Hvdroxyethyl-Triazine and Potential New Scavengers", AIChE 2002 Spring National Meeting, Trondheim, Norway.

International Search Report issued Mar. 5, 2014 for International Application No. PCT/US2013/055583.

\* cited by examiner

PROCESS AND COMPOSITION FOR THE REMOVAL OF HYDROGEN SULFIDE FROM INDUSTRIAL PROCESS FLUIDS

CROSS-REFERENCE TO RELATED APPLICATIONS

This application is a 371 of PCT/EP2012/068592, filed Sep. 21, 2012, which claims the benefit of U.S. Provisional Patent Application No. 61/538,265, filed Sep. 23, 2011, the contents of each of which are incorporated herein by reference.

FIELD OF THE INVENTION

The present invention relates to chemical compositions and methods for the rapid and sustained prevention, control, and removal of sulfhydryl compounds, such as hydrogen sulfide, and its corresponding corrosion products from industrial process streams. It further relates to the use of chemical compositions and methods for reducing both the oxidant demand by sulfhydryl compounds in industrial process streams as well as the corrosion rates in said systems.

BACKGROUND OF THE INVENTION

The prevention, removal, and remediation of hydrogen sulfide ($H_2S$) and other sulfhydryl compounds from liquid or gaseous industrial process streams is a challenge in a wide range of industries. The presence of $H_2S$ poses significant environmental and safety concerns to personnel and operators. This is due in part to the fact that $H_2S$ is highly flammable, highly toxic when inhaled (8 h of exposure at 100 ppm has been reported to cause death while levels of 1,000 ppm can cause death within minutes), highly corrosive, and malodorous. Further, corrosion and scale deposits resulting from the presence of hydrogen sulfide in contact with metallic surfaces, such as carbon steel pipes can further disruption industrial operations via the plugging of pipes, valves, nozzles, and the like.

In the oil and gas industry, the removal of $H_2S$ is important for the transport and storage of crude reserves as well as meeting standards for downstream refining, an important consideration due to sulfide poisoning of cracking catalysts and transmission of gas. Further, in both the refining industry and geothermal power industry, cooling tower process water can contain moderate to high levels of $H_2S$, both causing significant solids development as well as increasing the level of oxidant demand so as to make oxidants unviable options for microbial control in these systems.

Nonetheless, the challenge of removing and/or reducing $H_2S$ from process streams has been addressed with a variety of different technologies. Common techniques utilize either absorption with a solvent or solid phase material with subsequent regeneration of the absorbent, or reaction with a suitable substance or substrate that produces a corresponding reaction product. This reactivity has often involved the reaction of $H_2S$ with various types of aldehydes. For instance, U.S. Pat. No. 1,991,765 was an early example describing the reaction of formaldehyde with hydrogen sulfide to form an insoluble product, later identified as the sulfur heterocycle 1,3,5-trithiane.

U.S. Pat. No. 2,426,318 discloses a method of inhibiting the corrosivity of natural gas and oil containing soluble sulfides by utilizing an aldehyde such as formaldehyde.

U.S. Pat. No. 3,459,852 discloses a method for removing sulfide compounds with α,β-unsaturated aldehydes or ketones such as acrolein or 3-buten-2-one as the reactive compounds. Nonetheless, acrolein is a hazardous, highly toxic chemical limiting extensive use in a wider variety of applications.

U.S. Pat. No. 4,680,127 describes a method for reducing $H_2S$ in a neutral to alkaline aqueous medium (pH ~7-9) with the formation of solids, a problem when using formaldehyde, using glyoxal and glyoxal/formaldehyde mixtures without the formation of solids. However, the glyoxal/formaldehyde mixtures exhibited slower rates of $H_2S$ scavenging than glyoxal alone.

European patent application EP 1 624 089 A1 describes the use of mixtures of glyoxal with a metal nitrate compound in conjunction with triazines or N-chlorosuccinimide for preventing $H_2S$ odor generation, particularly that being microbial in origin, but not being biocidal. This reduction in $H_2S$ was reported to reduce corrosion as well. The use of the N-chlorosuccinimide was for the purpose of maintaining a particular redox potential and intended to oxidize or consume residual $H_2S$. Maintenance of a halogen residual after $H_2S$ scavenging is not described.

U.S. Pat. No. 4,978,512 describes a method whereby an alkanolamine and an aldehyde are combined to form a triazine in order to scavenge $H_2S$.

U.S. Pat. No. 5,498,707 describes a composition wherein a diamine and an aldehyde donor are utilized to scavenge $H_2S$ from liquid or gaseous process streams.

The composition forms water soluble polymers but does not claim to impact iron sulfide scale.

U.S. Pat. No. 7,438,877 discloses a method for $H_2S$ removal utilizing mixed triazine derivatives for improved scavenging. The mixture improves the overall scavenging capacity of triazines, but whether complete removal is achieved for a theoretically stoichiometric amount is not reported. However, it is known that typically triazines, such as hydroxyethyl triazines, do not scavenge $H_2S$ stoichiometrically (i.e., 3 mol of $H_2S$ per mol triazine) due to formation of cyclic thiazines that do not further react with $H_2S$ (Buhaug, J.; Bakke, J. M. "Chemical Investigations of Hydroxyethyl-triazine and Potential New Scavengers", AIChE 2002 Spring National Meeting).

In addition, methods and compositions have been described for the treatment of iron sulfide deposits. For instance, U.S. Pat. No. 6,986,358 discloses a method for combining an amine with tris(hydroxymethyl)phosphine in a reaction at a pH of 8 to complex and dissolve deposits of iron sulfide. Similarly, the combination of ammonia with bis-(tetrakis(hydroxymethyl)phosphonium) sulfate forms a tetradentate ligand that complexes iron (Jeffrey, J. C.; Odell, B.; Stevens, N.; Talbot, R. E. "Self Assembly of a Novel Water Soluble Iron(II) Macrocyclic Phosphine Complex from Tetrakis(hydroxymethyl)phosphonium Sulfate and Iron(II) Ammonium Sulfate": *Chem. Commun.*, 2000, 101-102. Further, WO 02/08127 A1 combines the concept of using an amine, carboxylic acid amine salt, aminophosphonic acid, or ammonia in combination with bis-(tetrakis(hydroxymethyl) phosphonium) sulfate or tris(hydroxymethyl)phosphine to inhibit and reduce the amount of iron sulfide deposits in a water system.

While multiple methods have been developed for scavenging $H_2S$ and sulfhydryl compounds from industrial process systems, a high capacity, fast reacting method for reducing hydrogen sulfide, mitigating sources of hydrogen sulfide, such as microbiological sources, and removing products of hydrogen sulfide corrosion, such as iron sulfide, which performs at similar levels over a wide pH range and does reduces solids formation is still desired. Further, it is desirable to be able to use the chemical in industrial process systems that have $H_2S$ present via either process leaks or influent, such as produced water storage tanks, fracturing fluids, cooling tower refineries, and geothermal cooling towers.

SUMMARY OF THE INVENTION

In order to address the need to prevent, inhibit, and remediate $H_2S$ and its scale deposits from multiple sources, the present invention provides a composition obtained by combining at least one aldehyde or aldehyde donor that is not a triazine with the reaction product of an amino acid and a hydroxymethylphosphine or hydroxymethylphosphonium salt and, optionally, a quaternary ammonium salt or amine. Preferably, the pH of the composition is adjusted between about 1 and about 9, more preferably between about 2 and about 7, and most preferably between about 3 and about 6.

Another aspect of the present invention is a method of preventing the formation of and reducing the amount of iron sulfide in an industrial water or process circuit, such as an oil and gas pipeline or geothermal cooling tower. The inventive method comprises adding the composition described above to inhibit, disperse, and dissolve iron sulfide deposits within an industrial process circuit.

Another aspect of the present invention is a method of preventing the formation of hydrogen sulfide and, consequently, iron sulfide in an industrial water or process circuit due to microbial contamination. The inventive method comprises adding the composition described above to inhibit or reduce the growth of sulfate-reducing bacteria.

In one embodiment of the invention, the at least one aldehyde or formaldehyde releasing compound is selected from the group consisting of hydroxymethylhydantoins, bis(hydroxymethyl)hydantoins, imidazolidinyl urea, glyoxal, formaldehyde, glutaraldehyde, and acrolein.

In one embodiment of the invention, the amino acid is combined with the hydroxymethylphosphine or hydroxymethylphosphonium compound at acidic pH prior to combination with the aldehyde or aldehyde donor.

The hydroxymethylhydantoins are preferably selected from the group consisting of 1-hydroxymethyl-5,5-dimethylhydantoin, 3-hydroxymethyl-5,5-dimethylhydantoin, 1,3-bis(hydroxymethyl)-5,5-dimethylhydantoin, and mixtures thereof.

The amino acids may be α-amino acids or other amino acids such as β- or ω-amino acids. With the exception of glycine, α-amino acids can exist in two or more stereoisomeric forms, namely the L-form (which is the form usually found in proteins) and the D-form. For the purpose of this invention all stereoisomers as well as their (racemic or non-racemic) mixtures are suitable and here and in the following the plain names of the amino acids are meant to comprise all stereoisomers as well as their mixtures. Particularly useful amino acids are those selected from the group from the group consisting of glycine, lysine, alanine, histidine, aspartic acid, glutamic acid, serine, threonine, asparagine, glutamine, cysteine, proline, valine, isoleucine, leucine, methionine, phenylalanine, tyrosine, tryptophan, and 12-aminolauric acid.

In another embodiment of the composition of the present invention, a quaternary ammonium compound or amine can be combined with the amino acid and hydroxymethyl phosphine or phosphonium salt reaction product and aldehyde or aldehyde donor wherein the quaternary ammonium compound has a formula of $(R^1R^2R^3R^4N^+)_n X^{n-}$ wherein $R^1$, $R^2$, $R^3$, and $R^4$ are each independently an alkyl group having from 1 to 30 carbon atoms or an arylalkyl group having from 7 to 30 carbon atoms, and $X^{n-}$ s a mono- or polyvalent anion such as a halide, a $C_{2-20}$ mono- or dicarboxylate, a borate, nitrate, bicarbonate, carbonate, sulfamate, a sulfonate, sulfate, or a phosphate.

Alkyl groups are any linear, branched or cyclic saturated hydrocarbyl groups having the stated number of carbon atoms. Arylalkyl groups are alkyl groups substituted with an aryl group, preferably with a phenyl group, such as benzyl (phenylmethyl) or phenylethyl.

Halides are fluorides, chlorides, bromides or iodides, preferably chlorides or bromides.

$C_{2-20}$ mono- or dicarboxylates are anions derived from saturated or unsaturated mono- or dicarboxylic acids having 2 to 20 carbon atoms, such as acetate, propionate, butyrate, pentanoate, hexanoate, octanoate, decanoate, dodecanoate (laurate), tetradecanoate (myristate), hexadecanoate (palmitate), octadecanoate (stearate), oleate, linolate, oxalate, malonate, succinate, glutarate, adipate, 1,8-octanedioate, 1,10-decanedioate, 1,12-dodecanedioate and the like.

Borates may be monoborates (containing the $BO_3^{3-}$ anion) or polyborates such as di-, tri-, tetra-, penta-, hexa-, or octaborates.

Sulfonates may be alkanesulfonates, such as methanesulfonate or trifluoromethanesulfonate, or arenesulfonates, such as benzene- or toluenesulfonate.

Sulfates may be "neutral" sulfates or "acid" sulfates (hydrogensulfates, bisulfates).

Similarly, phosphates may be orthophosphates ($PO_4^{3-}$), hydrogenphosphates ($HPO_4^{2-}$) or dihydrogenphosphates ($H_2PO_4^-$).

The substituted N-hydrogen compound is preferably selected from the group consisting of p-toluenesulfonamide, 5,5-dialkylhydantoins, methanesulfonamide, barbituric acid, 5-methyluracil, imidazoline, pyrrolidone, morpholine, ethanolamine, acetanilide, acetamide, N-ethylacetamide, phthalimide, benzamide, succinimide, N-methylurea, acetylurea, methyl allophanate, methyl carbamate, phthalohydrazide, pyrrole, indole, formamide, N-methylformamide, dicyanodiamide, ethyl carbamate, 1,3-dimethylbiuret, methylphenylbiuret, 4,4-dimethyl-2-oxazolidinone, 6-methyluracil, 2-imidazolidinone, ethyleneurea, 2-pyrimidone, azetidin-2-one, 2-pyrrolidone, caprolactam, phenylsulfinimide, phenylsulfinimidylamide, diaryl- or dialkylsulfinimides, isothiazoline-1,1-dioxide, hydantoin, glycinamide, creatine, glycoluril, $C_{1-20}$ alkylamines, ($C_{1-20}$ alkyl)-alkylenediamines, or ($C_{1-20}$ alkyl)-alkylenetriamines.

The hydroxymethylphosphine or hydroxymethylphosphonium compound is preferably selected from the group consisting of tris-(hydroxymethyl)phosphine, tetrakis(hydroxymethyl)phosphonium chloride, bis-[tetrakis(hydroxymethyl)phosphonium]sulfate, 1,2-bis[bis(hydroxymethyl)phosphino]benzene, 1,ω-bis[bis(hydroxymethyl)-phosphino]alkylenes wherein the alkylene is a $C_{1-6}$ methylene chain, tris(hydroxymethyl)($C_{1-20}$ alkyl) phosphonium halides, and tris(hydroxymethyl)(aryl-$C_{1-20}$ alkyl)-phosphonium halides.

DETAILED DESCRIPTION OF THE INVENTION

The present invention effectively inhibits the generation of and decreases the levels of hydrogen sulfide and sources of hydrogen sulfide, such as sulfate reducing bacteria, and iron sulfide deposits in industrial process systems. In contrast to previously disclosed methods, such as that described in U.S. Pat. No. 6,986,358, the present invention can be performed effectively at both acidic and basic pH when the composition is contacted with the industrial process stream.

The compositions of this invention are obtained by initially generating the reaction product of an amino acid and a hydroxymethylphosphine or hydroxymethylphosphonium salt at acid pH via the direct combination of the amino acid with the hydroxymethylphosphine or hydroxymethylphosphonium salt at a molar ratio amino acid/hydroxymethyl phosphine of 1:1 to 12:1. Although such products have been previously described for biomedical motifs in the reaction with amino acids and peptides (Berning, D. E.; Katti, K. V.; Barnes, C. L.; Volkert, W. A. "Chemical and Biomedical Motifs of the Reactions of Hydroxymethylphosphines with Amines, Amino Acids, and Model Peptides", *J. Am. Chem. Soc.*, 1999, 121, 1658-1664), the efficiency of such reaction products in dissolving iron sulfide has not been previously reported. Surprisingly, it has been found that combinations of these reaction products with hydrogen sulfide scavengers and, optionally, quaternary ammonium compounds or amines result in more rapid iron sulfide dissolution than previously disclosed compositions (U.S. Pat. No. 6,986,358), as well as rapidly prevent the formation of residual iron sulfide scale within a system. A particularly useful aspect of the present invention is the avoidance of polymeric precipitates upon mixing the amino acid and the hydroxymethylphosphine or hydroxymethylphosphonium salt, as observed with ammonia and its salts (U.S. Pat. No. 6,986,358).

The amino acid and hydroxymethylphosphine or hydroxymethylphosphonium salt reaction product is then combined with either an aldehyde or aldehyde donor, such as a methylolhydantoin, and optionally combined with a quaternary ammonium compound or amine. The preferred pH of the composition is adjusted between about 1 and about 9, more preferably between about 2 and about 7, and most preferably between about 3 and about 6 with an appropriate acid or base, such as hydrochloric acid or sodium hydroxide, if necessary.

Quaternary ammonium compound of the general formula of $(R^1R^2R^3R^4N^+)_n X^{n-}$, wherein $R^1$, $R^2$, $R^3$, and $R^4$ are each independently an alkyl or arylalkyl group having from 1 to 30 carbon atoms and $X^{n-}$ is a mono- or polyvalent anion such as a halide, a $C_{2-20}$ mono- or dicarboxylate, a borate, nitrate, bicarbonate, carbonate, sulfamate, a sulfonate, sulfate, or a phosphate are particularly efficacious. Examples include didecyldimethylammonium chloride, didecyldimethylammonium carbonate, didecyldimethylammonium phosphate, didecyldimethylammonium sulfamate, didecyldimethylammonium citrate, ($C_{10-18}$ alkyl)-dimethyl-benzylammonium chloride, or ($C_{10-18}$ alkyl)-dimethyl-benzylammonium carbonate. Commercially available products include Bardac™ 2280, Carboquat™ 250 WT, Barquat™ MB-80, and Barquat™ 50-28, all available from Lonza Inc, Allendale, N.J.

The compositions used in the method of the present invention are particularly suitable for scavenging $H_2S$ and preventing iron sulfide deposition. Molar ratios of the composition to the amount of $H_2S$ present in the system are preferably from 0.25:1 to 100:1, more preferably from 1:1 to 60:1, most preferably from 4:1 to 30:1 of the aldehyde or aldehyde donor, preferably from 0.25:1 to 50:1, more preferably from 1:1 to 30:1, most preferably from 2:1 to 10:1, for the reaction product of an amino acid with the hydroxymethyl phosphonium salt, and preferably from 0.25:1 to 100:1, more preferably from 1:1 to 60:1, most preferably from 4:1 to 30:1 of the quaternary ammonium or N-Hydrogen compound, or mixture thereof. Further, these compositions may optionally comprise additional additives such as surfactants, dispersants, demulsifiers, scale inhibitors, corrosion inhibitors, antifoaming agents, oxygen scavengers such as ascorbic or erythorbic acid, and flocculants.

In a preferred application of the method of the present invention the industrial process system is selected from the group consisting of an oil and gas production system, a produced water storage tank, an oil storage tank, an oil or gas transmission pipeline, ballast water tank, or oil transportation tank.

In another preferred application of the method of the present invention the industrial process system is a cooling tower such as a refinery or geothermal cooling tower.

In still another preferred application of the method of the present invention the industrial process system is a fuel storage tank.

In still another preferred application of the method of the present invention the industrial process system is an oil storage tank or transport system.

In still another preferred application of the method of the present invention the industrial process fluid is a fracturing fluid or a drilling mud.

In a preferred embodiment of the method of the present invention the aldehyde or aldehyde donor, the reaction product of the hydroxymethylphosphine or hydroxymethylphosphonium compound and amino acid, and, optionally, the quaternary ammonium compound or N-hydrogen compound, are combined prior to addition to the system.

In another preferred embodiment of the method of the present invention the aldehyde or aldehyde donor and the reaction product of the hydroxymethylphosphine or hydroxymethylphosphonium compound and amino acid are combined prior to addition to the system and the quaternary ammonium compound or N-hydrogen compound is added separately to the system.

In still another preferred embodiment of the method of the present invention the aldehyde or aldehyde donor and the quaternary ammonium compound or N-hydrogen compound are combined separately from the reaction product of the hydroxymethylphosphine or hydroxymethylphosphonium compound and amino acid and each combined product is added separately to the system.

The following examples are given to illustrate the present invention. It should be understood, however, that the invention is not intended to be limited to the specified conditions or details described in the examples.

Example 1

In order to demonstrate the $H_2S$ scavenging ability of products of the present invention, 400 g of a model process water system at 400 ppm alkalinity was deoxygenated with a stoichiometric amount of oxygen scavenger (ammonium bisulfite) and the pH adjusted with either HCl, NaOH, or $CO_2$. Water (400.0 g) was charged with a NaSH standard in order to achieve a $H_2S$ concentration of about 50 ppm, followed by a solution containing 2.00 g of a 70% solution of 1,3-dimethylol-5,5-dimethylhydantoin. A solution of a composition according to the present invention was prepared by combining glycine (0.11 mol) with bis[(tetrakishydroxymethyl)phosphonium]sulfate (0.018 mol) and water (0.92 mol). 5.02 g of the resulting solution was combined with an equivalent weight of 70% (w/w) solution of methylolhydantoin and dosed such that the corresponding hydrogen sulfide solution contained the corresponding amount of methylolhydantoin scavenger. Reaction progress was monitored by measuring the residual $H_2S$ at specified time intervals via titration.

The % residual $H_2S$ levels are shown as a function of pH versus other known chemical technologies. The high performance capacity and pH-insensitive performance of the products of the present invention are readily observed.

TABLE 1

| Time (min) | pH | | | |
|---|---|---|---|---|
| | 5 | 7.2 | 8.4 | 9.4 |
| 0 | 100% | 100% | 100% | 100% |
| 2.5 | 86% | 90% | 88% | 91% |
| 5 | 86% | 89% | 88% | 94% |
| 15 | 71% | 77% | 77% | 81% |
| 60 | 46% | 50% | 38% | 35% |
| 90 | 25% | 32% | 27% | 34% |
| 125 | — | — | 13% | — |
| 150 | 19% | 14% | — | — |
| 180 | — | 11% | — | 11% |

Example 2

In order to demonstrate the $H_2S$ scavenging ability of products of the present invention, 400 g of a model process water system at 400 ppm alkalinity was deoxygenated with a stoichiometric amount of oxygen scavenger and adjusted with either NaOH or $CO_2$ to a pH of 9.4. The water was charged with a NaSH standard to achieve ~50 ppm $H_2S$, followed by a scavenger solution containing 2.00 g of a 70% solution containing 1,3-dimethylol-5,5-dimethylhydantoin, prepared as described in Example 1 (molar ratio of scavenger to $H_2S$: 14:1). For comparison, triazine $H_2S$ scavenging was also evaluated under similar conditions at equivalent levels. Reaction progress was monitored by measuring the residual $H_2S$ at specified time intervals via titration. The higher performance capacity products of the present invention are readily observed.

TABLE 2

| Time (min) | Present Invention | Triazine |
|---|---|---|
| 0 | 100% | 100% |
| 2.5 | 91% | 91% |
| 5 | 94% | 89% |
| 15 | 81% | 98% |
| 30 | 61% | 97% |
| 60 | 35% | — |
| 90 | 34% | — |
| 125 | — | 83% |
| 180 | 11% | — |

Example 3

In order to demonstrate the superior iron sulfide dissolution ability of the products of the present invention, the time to complete dissolution of iron sulfide was compared. To a 10 mL vial containing an iron filing in 1% NaCl, an HCl and NaSH standard solution was added to generate 480 ppm $H_2S$ at pH ~5. Immediate formation of iron sulfide was observed. The precipitate was treated with the reaction product of 0.11 mol glycine with 0.018 mmol bis-[tetrakis(hydroxymethyl) phosphonium]sulfate (6:1 molar ratio) in 0.92 mol of water, prepared in a manner analogous to that described in Berning, D. E.; Katti, K. V.; Barnes, C. L.; Volkert, W. A. "Chemical and Biomedical Motifs of the Reactions of Hydroxymethylphosphines with Amines, Amino Acids, and Model Peptides", *J. Am. Chem. Soc.*, 1999, 121, 1658-1664. 5.02 g of this solution was combined with 5.05 g of a 70% solution containing 1,3-dimethylol-5,5-dimethylhydantoin. For comparison, the rate of iron sulfide dissolution of the reaction of ammonia with bis-[tetrakis(hydroxymethyl)phosphonium] sulfate was compared.

TABLE 3

| Time to Complete Dissolution | |
|---|---|
| Present Invention (10% as product) | $NH_3$ + THPS (10% as Product) |
| 7.0 min | 17.5 min |

Example 4

In order to demonstrate the prevention of generation of iron sulfide deposits via chemical sources by compositions of the present invention, 1.0 mL multiple concentrations of the product as prepared in Example 3 were added to 9 mL of 1% salinity water in oxygen-free vials containing iron filings for iron sulfide generation upon addition of a sulfide source (target 500 ppm as $H_2S$). As shown in Table 4, iron sulfide was generated immediately in the control sample upon addition of sulfide, whereas complete scavenging of $H_2S$ and rapid dissolution of iron sulfide was observed at multiple concentrations of formulations of the present invention.

TABLE 4

| Observation | Formulation Concentration | | | | | |
|---|---|---|---|---|---|---|
| | 10% | 4% | 2% | 1% | 0.85% | 0% |
| FeS formed upon $H_2S$ addition? | No | No | No | No | Yes | Yes |
| Reduced FeS relative to Control? | Yes | Yes | Yes | Yes | Yes | — |
| Solution after 1 min | Clear | Clear | Clear | Clear | Gray/Black | Black |
| Solution after 8 min | Clear | Clear | Clear | Clear | Slight Gray Haze | Black |

Example 5

In order to demonstrate the ability of compositions of the present invention to prevent FeS formation, a solution was prepared via combination of 0.11 mol of glycine with 0.018 mol of bis((tetrakishydroxymethyl)phosphonium) sulfate and 0.92 mol of water. 3.77 g of this solution was combined with 3.78 g of a solution containing methylolhydantoin (mixture containing 1,3-dimethylol-5,5-dimethylhydantoin and monomethylol-5,5-dimethylhydantoins) and 2.54 g of a 70% solution of dimethyldidecylammonium chloride. 1 mL of the resulting solution was added to 9 mL of a 1% brine solution containing an iron nail. 0.15 mL of 1 N HCl was added, followed by 0.20 mL of a 39,500 ppm NaSH solution and compared to a control sample without the solution. No FeS was formed in the solution containing 1% of a mixture of the present invention, whereas FeS was formed in the control.

The invention claimed is:

1. A method for preventing the generation of, and/or removing hydrogen sulfide and/or sulfhydryl compounds and their corrosion products, including iron sulfide, in an industrial process fluid or system, which comprises adding to the industrial process fluid or system an effective amount of a composition comprising:

(i) at least one aldehyde or aldehyde donor that is not a triazine (ii) the reaction product of a hydroxymethylphosphine or hydroxymethylphosphonium compound and an amino acid and, optionally, (iii) a quaternary ammonium or N-hydrogen compound or mixture thereof, wherein the hydroxymethylphosphine or hydroxymethylphosphonium compound and the amino acid are in a molar ratio of 1:1 to 1:12, and wherein the molar ratio of the aldehyde or aldehyde donor to the reaction product of the hydroxymethylphosphine or hydroxymethylphosphonium compound and the amino acid is from 0.02:1 to 100:1.

2. The method of claim 1, wherein the composition includes the quaternary ammonium compound and has the formula $(R^1R^2R^3R^4N^+)_nX^{n-}$ wherein $R^1$, $R^2$, $R^3$, and $R^4$ are each independently an alkyl group having from 1 to 30 carbon atoms or an arylalkyl group having from 7 to 30 carbon atoms, and $X^{n-}$ is a mono- or polyvalent anion selected from the group consisting of a halide, a $C_{2-20}$ mono- or dicarboxylate, a borate, nitrate, bicarbonate, carbonate, sulfamate, a sulfonate, sulfate, and a phosphate.

3. The method of claim 1, wherein the molar ratio of the aldehyde or aldehyde donor to quaternary ammonium or N-hydrogen compound or mixture thereof is from 0.1:1 to 100:1.

4. The method of claim 1, wherein the composition includes the N-hydrogen compound and is selected from the group consisting of p-toluenesulfonamide, 5,5-dialkylhydantoins, methanesulfonamide, barbituric acid, 5-methyluracil, imidazoline, pyrrolidone, morpholine, ethanolamine, acetanilide, acetamide, N-ethylacetamide, phthalimide, benzamide, succinimide, N-methylurea, N-acetylurea, methyl allophanate, methyl carbamate, phthalohydrazide, pyrrole, indole, formamide, N-methylformamide, dicyanodiamide, ethyl carbamate, 1,3-dimethylbiuret, methylphenylbiuret, 4,4-dimethyl-2-oxazolidinone, 6-methyluracil, 2-imidazolidinone, ethyleneurea, 2-pyrimidone, azetidin-2-one, 2-pyrrolidone, caprolactam, phenylsulfinimide, phenylsulfinimidylamide, diarylsulfinimides, dialkylsulfinimides, isothiazoline-1,1-dioxide, hydantoin, glycinamide, creatine, glycoluril, $C_{1-20}$ alkylamines, $(C_{1-20}$ alkyl)alkylenediamines, and $(C_{1-20}$ alkyl)alkylenetriamines.

5. The method of claim 1, wherein the at least one aldehyde or aldehyde donor is selected from the group consisting of hydroxymethylhydantoins, bis(hydroxymethyl)hydantoins, imidazolidinyl urea, glyoxal, formaldehyde, glutaraldehyde, N-methylolurea, and acrolein.

6. The method of claim 1, wherein the hydroxymethylphosphine or hydroxymethylphosphonium compound is selected from the group consisting of tris-(hydroxymethyl) phosphine, tetrakis(hydroxymethyl)phosphonium chloride; bis-[tetrakis(hydroxymethyl)phosphonium]sulfate, 1,2-bis [bis(hydroxymethyl)-phosphino]benzene, 1,ω-bis[bis(hydroxymethyl)phosphino]alkylenes wherein the alkylene is a $C_{1-6}$ methylene chain, tris(hydroxymethyl)($C_{1-20}$ alkyl)phosphonium halides, and tris(hydroxymethyl)(aryl-$C_{1-20}$ alkyl) phosphonium halides.

7. The method of claim 1, wherein the amino acid is selected from the group consisting of glycine, lysine, alanine, histidine, aspartic acid, glutamic acid, serine, threonine, asparagine, glutamine, cysteine, proline, valine, isoleucine, leucine, methionine, phenylalanine, tyrosine, tryptophan, 12-aminolauric acid, and mixtures thereof.

8. The method of claim 1, wherein the industrial process system is selected from the group consisting of an oil and gas production system, a produced water storage tank, an oil storage tank, an oil or gas transmission pipeline, ballast water tank, or oil transportation tank.

9. The method of claim 1, wherein the industrial process system is a cooling tower.

10. The method of claim 1, wherein the industrial process system is a fuel storage tank.

11. The method of claim 1, wherein the industrial process system is an oil storage tank or transport system.

12. The method of claim 1, wherein the industrial process fluid is a fracturing fluid or a drilling mud.

13. The method of claim 1, wherein the aldehyde or aldehyde donor, the reaction product of the hydroxymethylphosphine or hydroxymethylphosphonium compound and amino acid, and, optionally, the quaternary ammonium compound or N-hydrogen compound, are combined prior to addition to the system.

14. The method of claim 1, wherein the aldehyde or aldehyde donor and the reaction product of the hydroxymethylphosphine or hydroxymethylphosphonium compound and amino acid are combined prior to addition to the system and the quaternary ammonium compound or N-hydrogen compound is added separately to the system.

15. The method of claim 1, wherein the aldehyde or aldehyde donor and the quaternary ammonium compound or N-hydrogen compound are combined separately from the reaction product of the hydroxymethylphosphine or hydroxymethylphosphonium compound and amino acid and each combined product is added separately to the system.

16. The method of claim 1, wherein the molar ratio of the aldehyde or aldehyde donor to the reaction product of a hydroxymethylphosphine or hydroxymethylphos-phonium compound and an amino acid is from 0.1:1 to 20:1.

17. The method of claim 1, wherein the molar ratio of the aldehyde or aldehyde donor to the reaction product of a hydroxymethylphosphine or hydroxymethylphos-phonium compound and an amino acid is from 0.5:1 to 4:1.

18. The method of claim 3, wherein the molar ratio of the aldehyde or aldehyde donor to quaternary ammonium or N-hydrogen compound or mixture thereof is from 0.2:1 to 20:1.

19. The method of claim 3, wherein the molar ratio of the aldehyde or aldehyde donor to quaternary ammonium or N-hydrogen compound or mixture thereof is from 0.5:1 to 6:1.

* * * * *